3,225,022
CATALYST COMPOSITIONS COMPRISING ALUMINUM CHLORIDE

Harry M. Andersen, Dayton, Ohio, and William K. Johnson, St. Louis, Mo., assignors to Monsanto Company, a corporation of Delaware
No Drawing. Filed Dec. 27, 1960, Ser. No. 78,212
6 Claims. (Cl. 260—94.9)

This invention relates to novel catalyst compositions which are effective for polymerization of ethylene and other polymerizable compounds, especially those containing a terminal methylene group. The invention also relates to the novel process for polymerizing olefins.

In certain preferred aspects, the invention pertains to the production of high density polyethylene by polymerizing ethylene in the presence of a catalyst commonly known as a Ziegler catalyst in conjunction which a solution of aluminum chloride in a tetraalkyltin compound. Another aspect of the present invention relates to the solution of aluminum chloride in a tetraalkyltin compound along with a Ziegler catalyst to polymerize ethylenically unsaturated monoolefin hydrocarbons having from 2 to 8 carbon atoms to solid high molecular weight polymers.

An object of this invention is to provide a useful form of a highly active catalyst for the preparation of high molecular weight solid polymer from ethylene. The catalyst compositions of this invention are effective in polymerizing ethylene to solid high molecular weight polymer having a high density.

Another object of this invention is to obtain a novel process for polymerization of ethylene to high molecular weight solid polymer. This invention can be practiced at comparatively low to moderate pressures and is particularly effective at relatively low temperatures.

Generally, Friedel-Crafts type catalysts have not been effective for converting ethylene to solid polymers, but instead have resulted in the production of liquid polymers from ethylene monomer. The practice of our invention will give solid polyethylene without the use of a co-catalyst, although in many instances it is desirable to combine our catalyst composition with one of the group of catalysts commonly known as Ziegler polymerization catalysts.

There have come into commercial prominance processes for the polymerization of ethylene and other monomers through the agency of the type of catalyst advanced by Prof.-Dr. Karl Ziegler of the Max Planck Institut at Mulheim Ruhr, Germany. Probably the preferred group of these catalysts is that disclosed in Belgian Patent No. 533,362, the disclosure of which is incorporated herein by reference, namely catalysts prepared by the interaction of a trialkylaluminum with a compound of a metal of Group IV–B, V–B or VI–B of the periodic system, including thorium and uranium, and especially compounds of titanium, zirconium, and chromium. These and a variety of other catalysts of Ziegler type, can be exemplified by the catalyst obtained by the interaction of a trialkylaluminum with $TiCl_4$. Other catalysts of the Ziegler type differ from those disclosed in the above-mentioned Belgian Patent No. 533,362 in various ways. Instead of or in addition to the aluminum trialkyls, catalysts of the type described in the Belgian patent can be made by reacting the various compounds of metals of Groups IV–B, V–B and VI–B disclosed therein with aluminum compounds of the general formula, $RAlX_2$, where R is hydrogen or hydrocarbon, X means any other substituent including hydrogen or hydrocarbon, particularly dialkylaluminum monohalides, also aluminum hydride, alkylaluminum dihydrides, dialkylaluminum hydrides, alkylaluminum dihalides, alkylaluminum dialkoxy compounds, dialkylaluminum alkoxy compounds. Other Ziegler type catalysts are prepared by the interaction of aluminum compounds of the general formula, $R_2AlX$, where R is a hydrocarbon radical such as an alkyl radical having 2 to 8 carbon atoms in the alkyl chain, and X is a halogen, such as chlorine, bromine, or iodine, with a metal compound of Group VIII of the periodic system, e.g., iron, nickel, cobalt or platinum or manganese. Certain preferred Ziegler polymerization catalysts are prepared by the interaction of a titanium tetrahalide or titanium trihalide, or a titanium tetraalkoxide with a compound of the formula, $RAlX_2$ or $R_2AlX$, where R and X are as defined above.

Those skilled in the art having knowledge of these matters, refer to catalysts of the foregoing type as Ziegler or Ziegler type catalysts or as Ziegler catalysts adapted for the low pressure polymerization of ethylene or ethylenically unsaturated monomers.

The Ziegler catalyst is believed to act as a heterogeneous catalyst, i.e., at least some of the product obtained by the interaction of the catalyst components is present in solid form, although often in such finely divided form as to be of colloidal or subcolloidal particle size. The Ziegler catalyst can be employed in the presence of a liquid suspending agent such as a liquid, inert hydrocarbon, e.g., heptane, octane, kerosene, etc. It is known that solvents which dissolve the Ziegler catalyst stop the polymerization reaction. When a Ziegler catalyst is added to our novel aluminum chloride-tetraalkyltin compounds it is possible that part of the aluminum chloride is adsorbed on the Ziegler catalyst surface. The overall effect is clear even though the mechanism is not fully understood, e.g., high catalyst activity and efficiency are obtained by our discovery.

By the practice of our invention, it is possible to obtain a higher yield of solid high molecular weight polymer per gram of catalyst. This greatly increased catalyst efficiency makes possible reduced processing costs, thus a higher yield of polymer is produced in a given time and for a given reactor. Lower catalyst costs likewise result in considerable savings to the manufacturer.

When our novel catalyst compositions are combined with a Ziegler polymerization catalyst for use in the polymerization of ethylene, polymer is produced having increased density, and excellent rigidity and toughness properties.

While our present invention is of special interest at the present time with respect to polyethylene in which crystallinity is almost solely a reflection of the degree and type of branching, it is also applicable to all Ziegler type polymerizations, special reference being made to the preparation of polypropylene, polybutene, poly-4-methylpentene-1 and to the preparation of coplymers of ethylene and propylene.

It is well known that aluminum chloride is very active as a polymerization catalyst for ethylene at moderate temperatures and pressures. However, under polymerizing conditions, aluminum chloride catalyzes the hydrogenation-dehydrogenation of aliphatic hydrocarbons. As a result, both polymerization and hydrogen disproportionation occur. Polymer olefins, as such or at the moment of formation, are subject to cyclization, intramolecular alkylation, and isomerization. The overall phenomenon (polymerization conjoined with hydrogen disproportionation) is recognized as "conjunct" polymerization, and has been described by Ipatieff and Grosse in the Journal of the American Chemical Society, volume 58, page 915 (1936).

It is an object of this invention to modify aluminum chloride to obtain a material retaining the excellent activity of aluminum chloride as a polymerization catalyst while at the same time suppressing or considerably reducing the activity of aluminum chloride as a catalyst for conjunct polymerization.

We have found that tetraalkyltin compounds are effective solvents for aluminum halides, particularly aluminum chloride, aluminum bromide, and aluminum iodide. When an aluminum halide such as aluminum chloride is warmed with a tetraalkyltin compound a clear solution is obtained. Although there is some evidence that a type of molecular complex is obtained, we have found that the tetraalkyltin compound can be recovered unchanged from this catalyst composition, indicating that an equilibrium does not seem to exist. In other words, there is apparently no interaction between the halide atoms and the alkyl radicals during the heating period.

We have found that finely divided aluminum chloride can be prepared by slow precipitation of aluminum chloride from its solution in the tetraalkyltin compound. Such finely divided aluminum chloride has an unexpected activity as a catalyst for polymerizing ethylene to solid, high molecular weight polymer. Precipitation of aluminum chloride from solution by the slow addition of an inert nonsolvent has given particles so finely divided that turbidity is the only apparent change taking place. The particles of aluminum chloride settle very slowly from the suspension. These particles when examined under a high powered optical microscope appear non-crystalline or amorphous. However, X-ray diffraction technique shows the presence of extremely small, sub-microscopic crystals, known as "crystallites." These crystallites have been measured by the technique of X-ray diffraction line broadening and by electron microscopy. These crystallites of aluminum chloride, prepared by a slow precipitation technique for use in polymerizing ethylene to high molecular weight solid polymer, range in size downward from about 2 microns to about 0.01 micron in diameter. It has not been possible to merely grind aluminum chloride to a fine state to prepare an active catalyst to polymerize ethylene to a solid polymer. We have demonstrated that totally different results are obtained by precipitating aluminum chloride from solution in a tetraalkyltin compound than are otbained by mechanically sub-dividing aluminum chloride by a process such as grinding.

When our novel catalyst compositions are used in combination with a Ziegler polymerization catalyst, the molar ratio of the components forming the catalyst mixture can be varied within wide limits, for example, a ratio of about 1 mole of titanium compound, about 40 moles of the organoaluminum compound and about 20 moles of aluminum chloride dissolved in a tetraalkyltin compound has proved advantageous. It is, however, also possible to use amounts of the individual components of the catalyst which lie far outside this ratio. Thus, the mole ratio of titanium compound to organoaluminum compound can vary between 1:40 and 4:1. The amount of the aluminum chloride can also be increased or reduced so that the mole ratio of aluminum chloride to titanium compound can vary between 1:50 and 2:1. The quantity of tetraalkyltin compound is used in at least such an amount to dissolve all of the aluminum chloride. Large excesses of the tetraalkyltin compound can be used as solvent if desired, however, there is very little advantage gained by using this rather expensive compound as solvent for the entire polymerization catalyst. Preferably, a saturated aliphatic, cycloaliphatic, aromatic or alkyl aromatic hydrocarbon is used as a solvent or diluent for the overall polymerization catalyst mixture.

In the preparation of our novel catalyst compositions, we prefer to select a tetraalkyltin compound that is liquid and comparatively non-volatile at ordinary temperatures. Tin compounds of the general formula $R_4Sn$, wherein R is an alkyl radical from 1 to 6 carbon atoms are particularly suitable. Each alkyl radical in the general formula can, of course, be the same or different. Further, the solubility of the aluminum halide in the tetraalkyltin varies with the number of carbon atoms in a single alkyl chain and with the total number of carbon atoms in the molecule. Representative tin compounds suitable for the preparation of our novel catalyst compositions include

| | |
|---|---|
| tetramethyltin | dimethyldi-n-butyltin |
| diethyldimethyltin | diethyldi-n-butyltin |
| tetraethyltin | methylethylpropyl-n-butyltin |
| tetrapropyltin | dipropyldi-n-butyltin |
| dimethylethylpropyltin | tetraisoamyltin |
| dimethyldiisobutyltin | tetra-n-amyltin |
| tetraisobutyltin | diethyldiisoamyltin |
| tetra-n-butyltin | dimethyldihexyltin |
| diethyldiisobutyltin | tetra-n-hexyltin |

The catalyst compositions of the instant invention comprise a solution of an aluminum halide selected from the group consisting of aluminum chloride, aluminum bromide, and aluminum iodide in a quantity of tetraalkyltin compound sufficient to dissolve said aluminum halide, wherein each alkyl radical of said tetraalkyltin compound contains from 1 to 6 carbon atoms.

In preparing our novel compositions, we prefer to add an anhydrous purified aluminum halide, i.e. $AlCl_3$, to the tetraalkyltin at about room temperature. Depending upon the carbon atom content of the tin compound, there is observed a temperature rise of a comparatively slight degree. However, generally but little of the aluminum halide dissolves at room temperature. It is preferable to heat the materials at an elevated temperature, say 65–150° C. to promote solution. Generally, mechanical stirring is used along with the heating although this is not absolutely required. As soon as solution is complete the composition can be cooled to room temperature and maintained for prolonged storage periods as long as stored in a moisture free atmosphere. Our compositions can be prepared by heating for a shorter interval the mixture of aluminum halide with tetraalkyltin and then filtering to remove any undissolved aluminum halide.

The exact chemical nature of our solutions is not understood. Although we do not intend to be limited by any theory, it is believed that molecular complexes are formed to at least a certain extent. This theory can be substantiated by the fact that when large excesses of the tetraalkyltin are used with comparatively small quantities of aluminum halide, that two liquid layers form after the heating period is completed. The lower liquid layer contains the aluminum halide bound by some loose molecular attraction. This phenomenon does not acect the catalytic activity of the catalyst composition, although it is desirable to avoid large excesses of the tetraalkyltin to avoid such multiphase formation. When two layers are obtained, it has been found that the greater proportion of the aluminum halide can be found in the lower or heavier liquid phase.

The preparation of our novel catalyst compositions can be described with reference to a typical aluminum halide, aluminum chloride, and a representative tetraalkyltin, tetra-n-butyltin. We prefer to employ from about 0.1 ml. to about 10 ml. of the tin compound for 1 millimole (mmole) of aluminum chloride. Solutions can be prepared that are easily handled by dissolving 1.0 mmole of aluminum chloride in from about 0.5 ml. to about 2.0 ml. tetra-n-butyltin. These two materials are then heated with agitation to about 130° C. to promote solution. A clear solution results which remains stable upon cooling to room temperature without precipitation of any crystalline aluminum chloride. It is a matter of routine experimentation to determine a time and temperature needed to promote solution when using other tetraalkyltins with either aluminum chloride, aluminum bromide, or aluminum iodide. Although we have postulated that some type of molecular attraction occurs to form a complex in preparing these solutions, it has been demonstrated that essentially all of the tetraalkyltin can be recovered in an unchanged form from these compositions if desired. This fact demonstrates that there is no interchange between the alkyl radicals and the halide portions of the aluminum compound in these compositions.

Our aluminum halide-tetraalkyltin compositions are effective catalysts for polymerization over a wide range of temperatures. The particular preferred temperatures are chosen in accordance with the monomer, pressure, solvent, other catalyst components and other reaction variables. For many monomers, from room temperature down to say −40° C. and even lower temperatures are suitable, and in many cases it is preferred that the temperature be maintained at below about 35° C. However, for the polymerization of ethylene, wider temperature ranges are useful, say from −100° C. up to about 100° C.

The pressure at which the polymerization is carried out is dependent upon the chosen monomer or monomers, as well as upon other variables. In most instances the polymerization is suitably carried out at atmospheric pressure or higher. Pressures ranging from atmospheric up to several hundred or even many thousand pounds per square inch are suitable. While high pressures are not required in order to obtain the reaction, they will have a desirable effect on reaction rate and in some instances, on polymer quality. The choice of whether or not to use an appreciably elevated pressure will be one of economic and practical consideration, taking into account the advantages that can be obtained thereby.

Catalyst mixtures which can be prepared according to our invention can be made by adding the solution of aluminum chloride in the tetraalkyltin to a Ziegler polymerization catalyst and then adding ethylene, or other monomer being polymerized, to the combined catalyst mixture, or the individual Ziegler catalyst components can be added separately to the tetraalkyltin solution of aluminum chloride. It is, however, also possible to mix the Ziegler catalyst with the aluminum chloride solution in the presence of ethylene monomer. As a further embodiment of our invention, we can concomitantly feed streams of Ziegler catalyst suspension, aluminum chloride solution in tetraalkyltin and gaseous ethylene monomer to the reactor.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture of the polymer after separation from solvent, with methanolic hydrochloric acid. with an aliphatic alcohol such as methanol, isobutanol, secondary butanol, or by various other procedures. If the polymer is insoluble in the solvent, it can be separated therefrom by filtration, centrifuging or other suitable physical separation procedures. If the polymer is soluble in the solvent, it is advantageously precipitated by admixture of the solution with a nonsolvent, such nonsolvent usually being an organic liquid miscible with the solvent but in which the polymer to be recovered is not readily soluble. If a high-boiling solvent is used, it is usually desirable to finish any washing of the polymer with a low-boiling material, such as one of the lower aliphatic alcohols or hexane, pentane, etc., which aids removal of the higher boiling materials and permits the maximum removal of extraneous material during the final polymer drying step. Such drying step is desirably effected in the vacuum oven at moderate temperatures, preferably well below 100° C.

In order to illustrate some of the various aspects and advantages of the invention, illustrative examples are given herein. Ethylene has been chosen as a representative monomer, to demonstrate the efficiency of our catalyst composition. Aluminum chloride is chosen as the aluminum halide and tetra-n-butyltin is chosen as the representative tetraalkyltin compound. It will, of course, be understood that variations from the particular catalyst components, reactants, solvents, proportions, temperatures and the like can be made without departing from the invention.

Example 1

The thoroughly dried glass reactor containing an atmosphere of dry nitrogen was charged with the mixture of 33.0 g., 0.096 mole, tetra-n-butyltin and 12.8 g., 0.096 mole, anhydrous sublimed aluminum chloride. There was no apparent reaction at room temperature and upon prolonged standing at room temperature there was no evidence of reaction or solution as the solid aluminum chloride phase remained undissolved. Materials were then heated to 130° C. and maintained at 130° C. for several hours with agitation being provided by a mechanical stirring device. Although there was no evidence of a reaction occurring, the aluminum chloride dissolved and a clear, homogeneous solution resulted. When this solution was cooled to room temperature the materials remained as a clear solution with no traces of crystallization or precipitation of the dissolved aluminum chloride.

Example 2

Equimolar amounts of tetra-n-butyltin and aluminum chloride (0.096 mole) were heated at 130° C. for three hours as described in Example 1. The aluminum chloride went into solution and a homogeneous reaction mixture resulted. This solution was then cooled to room temperature and 100 ml. of anhydrous ethyl ether added followed by the addition of 80 ml. 5% aqueous hydrochloric acid. The hydrolyzed material separated to the aqueous layer which was extracted with ethyl ether and the ether extract added to the original ethyl layer which was dried and distilled. There was obtained an essentially quantitative recovery of the tetra-n-butyltin, boiling point 135–157° C. (15 mm.); $n_D^{25}$ 1.4735. The test for chloride ion in the distillate was negative, indicating further that there was no reaction between the aluminum chloride and the tetraalkyltin compound.

Example 3

A glass reactor was charged with 25 ml. of catalyst solution prepared according to the procedure in Example 1 and the system cooled to −78° C. at atmospheric pressure by means of an external dry ice freezing mixture. While the catalyst solution was being vigorously agitated, liquid butane was added at a dropwise rate. Since butane is a nonsolvent for aluminum chloride, this catalyst was precipitated in a finely-divided form. The precipitated aluminum chloride particles appeared as a fog or turbidity in the liquid and tended to remain dispersed when agitation was stopped. Ethylene gas was passed through the catalyst dispersion with good agitation and within one hour the catalyst was coated with solid polyethylene.

Example 4

Catalyst composition prepared according to the procedure of Example 1, 25 ml., was slowly diluted with 150 ml. liquid propane and the reactor cooled to −78° C. A finely-divided precipitate of aluminum chloride, observable only as turbidity in the liquid, was formed. The suspension was saturated with ethylene and ethylene was supplied continuously as the polymerization reaction proceeded. Within about 30 minutes a precipitate had settled which was separated by decantation of the supernatant liquid. Trace quantities of catalyst were removed from the product by washing in boiling water and a solid ethylene polymer was then recovered.

Example 5

A Ziegler polymerization catalyst adapted for the low pressure polymerization of ethylene was prepared by mixing 20 millimoles (mmoles) diethylaluminum chloride, 0.5 mmoles, Ti(O—n—C$_4$H$_9$)$_4$, and 1000 ml. anhydrous heptane in a glass reactor. The catalyst components were aged by stirring for 30 minutes at room temperature. This Ziegler catalyst was then transferred under a dry nitrogen atmosphere in a dried stainless steel polymerization reactor and then a solution of 10 mmoles of aluminum chloride dissolved in 10 ml. tetra-n-butyltin as described in Example 1, was immediately added to the reactor. Dried ethylene gas was passed into the reactor for 90 minutes while maintaining an ethylene pressure in the reactor of 150 p.s.i., and a polymerization temperature of 70-72° C. The reactants were then cooled to room temperature and the catalyst quenched by the addition of 100 ml. isobutanol. Solid polyethylene was filtered from the reaction mixture and thoroughly washed with an isobutanol-methanol mixture and the product finally dried in a vacuum oven. The solid polyethylene prepared in this run, weight 75 g., was examined for physical properties. Polyethylene prepared in this run was characterized as having excellent rigidity and toughness properties together with an exceptionally high density, 0.9669. Its tensile properties were evaluated by ASTM–D Test No. 638–56 T, its tensile strength at yield was measured at 4522 p.s.i. and its tensile strength at break at 2944 p.s.i., while its percent elongation at break was determined to be 189%.

*Example 6*

In this run a Ziegler polymerization catalyst adapted for the low pressure polymerization of ethylene was prepared as described in the preceding example. A mixture of 0.5 mmole titanium tetrabutoxide, 20 mmoles diethylaluminum chloride and 100 ml. anhydrous n-heptane was stirred at room temperature for 30 minutes to age the catalyst before charging to the polymerization reactor. The aged Ziegler catalyst was transferred to the polymerization reactor and a one molar solution of 10 mmoles of aluminum chloride and 10 ml. tetra-n-butyltin, prepared according to the procedure of Example 1 added. As soon as the catalyst component of our instant invention was added, polymerization of ethylene was started by feeding ethylene to the reactor pressured to 150 p.s.i. with ethylene at a polymerization temperature of 70–75° C. The reaction was continued for two hours, and then the catalyst was quenched and the product isolated as described in the preceding example. The polyethylene obtained in this run, weight 65 g., was characterized by having an exceptionally high density of 0.9823 g./cc. indicating that a polymer having polymer chains of high linearity was prepared.

*Example 7*

In this run conditions of catalyst preparation, monomer charge, and polymerization conditions were adjusted to serve as a control run for Examples 5 and 6. The only difference in catalyst components used for this run was that there was no addition of aluminum chloride-tin tetraalkyl as a catalyst component. The polyethylene isolated from the reactor was characterized by having a density of 0.9447 g./cc. and tensile properties as follows:

Tensile properties (ASTM–D 638–56 T):
 Strength-yield (p.s.i.) _____ 3594
 Strength-break (p.s.i.) _____ 4730
 Tensile elongation-break, (percent) _____ 349

The examples described above are illustrative of a novel process for the modification of aluminum chloride so that it promotes and catalyzes the polymerization of ethylene to produce solid, high molecular weight polyethylene of high crystallinity and of high density without the production of side-reaction products, i.e., low molecular weight liquid polyethylenes.

Example 3 shows the preparation of aluminum chloride of crystallite structure and the unexpected high activity of this catalyst for polymerizing ethylene to solid polymer at −78° C. The reaction occurred rapidly and could be followed visually. Within a few minutes after addition of ethylene, the catalyst particles became coated with polymer, coagulation occurred followed by settling. The polymer obtained after a simple isolation step was a crystalline solid, entirely different from that made at high temperature by conjunct polymerization.

Example 4 illustrates the use of inert diluents to precipitate an aluminum chloride which is active in the preparation of solid, high molecular weight polymer from ethylene monomer at low temperatures. The diluent, when used with agitation by mechanical means, is useful in preventing build-up of polymer on the catalyst surface. However, in particular instances, the finely divided aluminum chloride can be used without a diluent or dispersant for the system, for example, a continuous polymerization system can be set whereby ethylene is passed in contact with a fluidized bed of crystallite, anhydrous aluminum chloride.

Additional examples are provided to demonstrate the effectiveness of our composition when used together with a Ziegler polymerization catalyst in preparing polyethylene having increased density, improved toughness and stiffness properties, and improved tensile properties.

While the above examples teach representative conditions which are effective when employing our composition of an aluminum halide dissolved in a tetraalkyltin compound as a catalyst constituent, it will be realized that the conditions can be varied to some extent in accordance with the general principles taught herein in order to obtain optimum results with particular catalyst systems. The ratio of the catalyst components, the catalyst concentration, the aging of the catalyst, the temperature and pressure during polymerization, etc., can be varied in order to modify polymer properties in the manner taught hereinabove. By the use of our novel composition together with an ethylene polymerization catalyst as taught by Ziegler, polyethylene can be prepared having an improved molecular weight distribution with resulting improved transparency of the polymer. This improvement makes it feasible to blow the polymer into film which is suitable for transparent wrapping materials and the like.

While the invention has been described with particular reference to preferred embodiments thereof, it will be appreciated that variations from the details given herein can be effected without departing from the invention in its broadest aspects.

We claim:

1. A process for the polymerization of an ethylenically unsaturated monoolefin hydrocarbon having from 2 to 8 carbon atoms, which comprises contacting said olefin monomer with a catalyst prepared by the interaction of (a) a titanium compound, (b) an aluminum compound of the general formula $R_2AlX$, wherein R is selected from the group consisting of alkyl and cycloalkyl radicals, and X is selected from the group consisting of hydrogen, halogen, alkyl and cycloalkyl radicals, and (c) a solution of an aluminum halide selected from the group consisting of aluminum chloride, aluminum bromide and aluminum iodide in a tetraalkyltin compound, wherein each alkyl radical of said tetraalkyl of tin contains from 1 to 6 carbon atoms.

2. Process according to claim 1 wherein said monoolefin hydrocarbon is ethylene.

3. A process for the production of polyethylene by polymerizing ethylene in the presence of a catalyst comprising (a) a titanium compound, (b) an organoaluminum compound of the general formula, $R_2AlX$, wherein R is selected from the group consisting of alkyl and cycloalkyl radicals and X is selected from the group consisting of hydrogen, halogen, alkyl and cycloalkyl radicals, and (c) a solution of anhydrous aluminum chloride in a tetraalkyltin compound wherein each alkyl radical of said tetraalkyltin compound contains from 1 to 6 carbon atoms.

4. A process for the production of polyethylene of high density which comprises polymerizing ethylene in the presence of a catalyst prepared by mixing (a) the product obtained by the interaction of one mole of a titanium compound with from 0.25 mole to 40 moles of an aluminum compound of the general formula, $R_2AlX$, wherein R is selected from the group consisting of alkyl and cycloalkyl radicals, and X is selected from the group consisting of hydrogen, halogen, alkyl and cycloalkyl radicals, and (b) from 0.02 to 20 moles of aluminum chloride dissolved in a tetraalkyltin.

5. The process of polymerizing ethylene to high molecular weight solid polymer which comprises contacting ethylene with a catalyst consisting essentially of an aluminum halide selected from the group consisting of aluminum chloride, aluminum bromide, and aluminum iodide dissolved in a tetraalkyltin, wherein each alkyl radical contains from 1 to 6 carbon atoms, in the presence of sufficient inert hydrocarbon diluent to precipitate at least part of the said aluminum halide from solution.

6. A polymerization catalyst prepared by mixing a tetraalkyltin solution of from 0.02 to 20 moles anhydrous aluminum chloride with the product obtained by the interaction of one mole of a titanium compound with from 0.25 mole to 40 moles of an aluminum compound of the general formula, $R_2AlX$, wherein R is selected from the group consisting of alkyl and cycloalkyl radicals and X is selected from the group consisting of hydrogen, halogen, alkyl and cycloalkyl radicals.

References Cited by the Examiner

UNITED STATES PATENTS

| | | | |
|---|---|---|---|
| 2,886,561 | 5/1959 | Reynolds et al. | 260—94.9 |
| 2,900,374 | 8/1959 | Aries | 260—94.9 |
| 2,953,554 | 9/1960 | Miller et al. | 260—94.3 |
| 2,989,487 | 6/1961 | Truett | 260—94.9 |
| 3,057,842 | 10/1962 | Calfee | 260—94.9 |

FOREIGN PATENTS 785,314 10/1957 Great Britain.

JOSEPH L. SCHOFER, *Primary Examiner.*

M. LIEBMAN, *Examiner.*